Aug. 27, 1963    G. MISSION ETAL    3,102,089
ASSEMBLY OF SOLID MODERATOR ELEMENTS FOR HIGH TEMPERATURE
NUCLEAR REACTORS SUBJECTED TO ACCELERATIONS
Filed Nov. 28, 1960
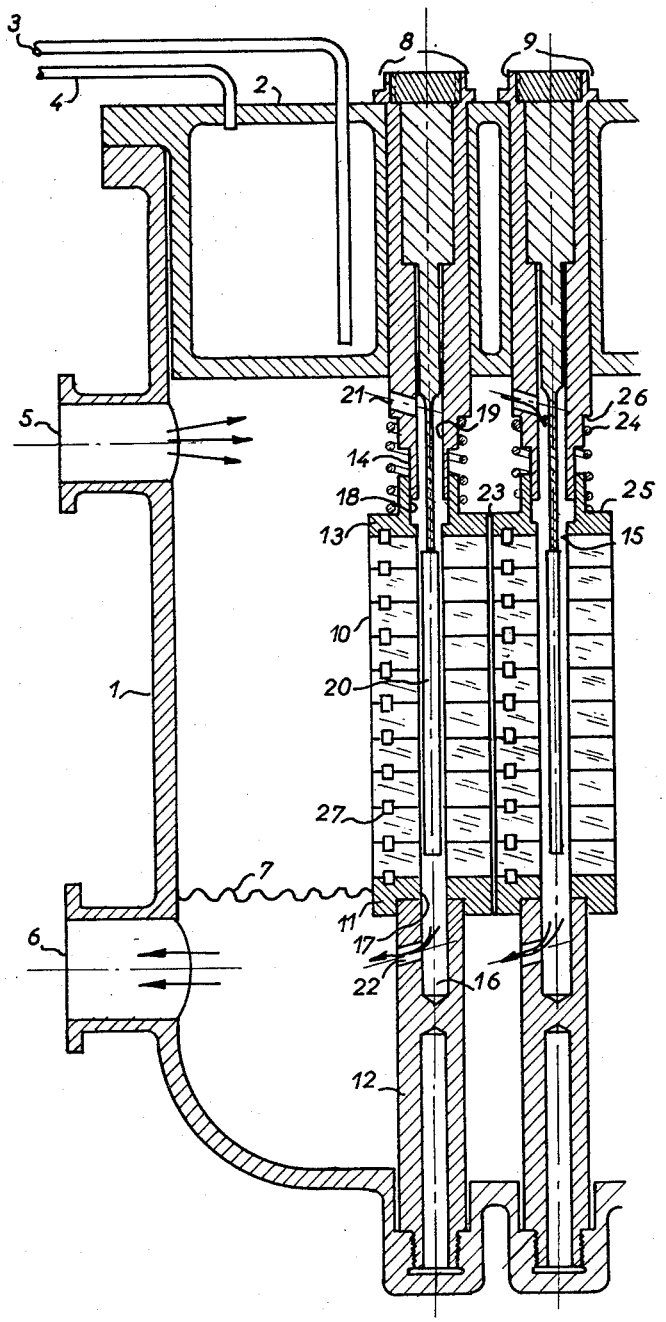

3,102,089
ASSEMBLY OF SOLID MODERATOR ELEMENTS FOR HIGH TEMPERATURE NUCLEAR REACTORS SUBJECTED TO ACCELERATIONS
Gilbert Mission, Bagneux, and Henri Meulien, Courbevoie, France, assignors to Societe Nationale d'Etude et de Construction de Moteurs d'Aviation, Paris, France
Filed Nov. 28, 1960, Ser. No. 72,049
Claims priority, application France Dec. 4, 1959
2 Claims. (Cl. 204—193.2)

The present invention relates to solid moderators for nuclear reactors and is concerned, in particular, with an assembly of solid moderator elements which are inside high temperature reactors, cooled by a gas circulating under pressure, and which can be subjected to movements of considerable amplitude.

For fixed reactors operating on the ground, it is known to form the moderator assembly by juxtaposition of a plurality of columns, each constituted by stacking a plurality of elements in the form of prisms. This applies, for instance, to numerous average or low temperature reactors moderated by graphite, in which the moderator has the form of a stack of prisms of hexagonal section.

In these standard reactors operating at low temperature, the problems raised by the thermal expansion and Wigner effect phenomena have been solved in a very satisfactory manner by making the moderator element assemblies with sufficient clearances. This is the case, for example, with the arrangements described in French specification No. 1,214,246, where the elements of a column, on the one hand, and the moderator columns, on the other, are connected together by means of pins, which may or may not form part of the elements constituting the columns.

As regards the construction of a high temperature reactor (above 500° C., for example) operating, moreover, on movable vehicles capable of subjecting it to substantial inclinations to the vertical and additionally to considerable accelerations or decelerations and, also, where the material used as the moderator does not allow connecting pins to be utilised, however, the problems surrounding the choice and structure of the moderator are complicated by considerations as to the behaviour of the materials at high temperatures and also by expansion considerations, both of which affect satisfactory operation of the reactor. As regards reaction cooled by a gas under pressure, in particular, the arrangements connected with circulation of this fluid make it difficult to utilise devices which are simultaneously simple and effective.

The present invention has the object of providing a solid moderator element assembly for high temperature nuclear reactors subjected to accelerations which permits both adaptation of the elements to high temperature and circulation of a refrigerant gas under high pressure.

According to the present invention, an assembly of solid moderator elements for high temperature nuclear reactors subjected to accelerations and to substantial inclinations to the vertical, which comprises an assembly of parallel moderator columns each constituted by a moderator stack and including an axial channel for receiving fuel elements and for permitting circulation of a refrigerant fluid, in which the columns are mutually independent and are capable of expanding laterally by reason of clearances provided between adjacent columns and axially by reason of resilient guide means which also provide axial compression for giving mechanical cohesion of each column.

In accordance with a preferred feature of the invention, the resilient guide means comprise terminal members disposed at one end of each of the columns and carried by support members connected to the reactor casing and tubular terminal members disposed at the other end of each of the columns and surrounding fixed sleeves relative to which the tubular members are longitudinally movable, helical springs being seated between shoulders provided on each tubular member and its associated sleeve.

In this manner, cohesion of the stack is achieved, even at high temperature and at varied inclinations, while still permitting longitudinal expansion; circulation of the refrigerant is effected through axial passageways provided in the cap members, support struts and sleeves.

According to other preferred features of the invention, the supports for the columns, at each end thereof, are maintained at a low temperature by vigorous cooling (the temperature being the same for all the supports) and only the columns themselves thus forming the region of isotopic deformation due to the effect of the high temperatures.

The springs or like means are advantageously disposed in the zone of lowest temperature, in order to preserve a sufficient elasticity.

The assembly of moderator elements of the invention is particularly well suited to high temperature gas piles utilised, for example, as an energy source for the propulsion of aeronautical machines such as aircraft, as they readily withstand substantial accelerations and decelerations. Also, since the moderator elements constituting each column are stacked and held tight under some pressure, the risk of escape of refrigerant fluid to the outside of the moderator body is reduced by a substantial amount.

In order that the invention may be readily understood, a preferred embodiment thereof is described below, by way of example only, in conjunction with the accompanying drawing, which shows a vertical section through the axes of two refrigeration channels of one form of moderator element assembly according to the invention.

The embodiment illustrated involves vertical disposition of the axes of the moderator columns, but the invention also applies to dispositions which are horizontal or at any desired inclination.

The casing of a reactor is shown at 1 and it is closed at its top by a cover 2 cooled by circulation of water by way of pipes 3 and 4. A refrigerant gas under pressure enters the casing 1 at 5 at a temperature around 350° C. and leaves at 6 at a temperature around 800° C., a deformable wall 7 separating the inlet zone from the outlet zone. The moderator stack is constituted by an assembly of columns, which are vertical in the present embodiment, such as 8 and 9, extending throughout the height of the casing 1.

The "moderator" part of any one column comprises moderator elements 10, for example of glucine or any other suitable material, which are superposed and have the form of prisms of any suitable section. These elements 10 are connected together by an appropriate system, for instance by locating lugs 27. The lowest element 10 of the column rests on a terminal member 11, to which it is connected by a system analogous to that interconnecting the elements 10 per se. The member 11 rests upon a support member or strut 13 secured to the lower part of the casing 1. The column of moderator elements is limited at its upper part by a tubular terminal member 13 connected to the last element 10 by a system analogous to that interconnecting the elements 10 per se. The tubular members 13 embraces a sleeve 14 secured to the cover 2 of the casing 1. The member 13 can slide longitudinally of the sleeve 14.

An axial channel 15 is formed partly by central apertures in the elements 10 and partly by a bore 16 in the support 12, a bore 17 in the member 11, a bore 18 in the member 13 and the bore 19 of the sleeve 14. The channel 15 receives fuel elements, such as 20, and permits circulation of the refrigerant gas, which enters at 21 and leaves at 22.

Lateral expansion of the moderator elements 10 is rendered possible, without deformation of the axial channels such as 15, by a sufficient clearance 23 between adjacent columns. This clearance is such that there is no contact between columns at maximum temperatures. Longitudinal expansion is permitted by sliding of the members 13 in the sleeves 14. A helical spring 24 abuts at one end a shoulder 25 formed on the member 13 and at the other end a shoulder 26 formed on the sleeve 14 and thus forcibly compresses the elements 10 together and provides for their mechanical cohesion under any conditions of expansion and vibration.

The walls of the casing 1 are maintained at low temperature by immersion of the latter in the protective water for the reactor (not shown). Also, the ends of the columns located near the sleeves 14 are submitted to the cooling effect of the cover 2. The ends of the moderator maintain a fixed position whatever the temperature of the reactor core may be.

According to the invention, therefore, an assembly of moderator elements is provided which preserves an excellent mechanical stability over an extended range of temperatures and has channels which remain substantially rectilinear with axes which have virtually invariable positions at all temperatures.

We claim:

1. An assembly of solid moderator elements for high temperature nuclear reactors subjected to accelerations and to substantial inclinations to the vertical which comprises a reactor casing, a plurality of parallel independent ceramic moderator columns in said casing, each of said columns comprising a stack of blocks and including an axial channel for receiving fuel elements and for circulation of a cooling fluid therein, each of said columns being spaced from adjacent ones of said columns for free lateral and radial extension and means for axial expansion for each of said columns including resilient guide means, comprising terminal members disposed at one end of each of said columns, support members for said terminal members connected to said casing, tubular terminal members disposed at the other end of each of said columns, a sleeve in each of said tubular terminal members connected to said casing, said tubular members being longitudinally movable with respect to said sleeves, spaced shoulders on each of said tubular members and the associated one of said sleeves and a helical spring seated between said shoulders.

2. A moderator assembly as described in claim 1 including axial passages in said terminal members, in said support members and in said sleeves for circulation of the cooling fluid.

References Cited in the file of this patent
UNITED STATES PATENTS 3,010,888    Battle _____ Nov. 28, 1961

FOREIGN PATENTS 1,198,353    France _____ June 8, 1959
1,214,246    France _____ Nov. 9, 1959